Aug. 5, 1958  E. A. SANDS  2,846,593
LOGICAL COMPUTING ELEMENT
Filed Jan. 30, 1953  7 Sheets-Sheet 1

INVENTOR
*Eugene A. Sands*
BY
ATTORNEYS

Aug. 5, 1958

E. A. SANDS 2,846,593

LOGICAL COMPUTING ELEMENT

Filed Jan. 30, 1953

INVENTOR
Eugene A. Sands
BY
ATTORNEYS

Aug. 5, 1958  E. A. SANDS  2,846,593
LOGICAL COMPUTING ELEMENT
Filed Jan. 30, 1953  7 Sheets-Sheet 3

FIG. 4

INVENTOR
Eugene A. Sands
BY
ATTORNEYS

Aug. 5, 1958     E. A. SANDS     2,846,593
LOGICAL COMPUTING ELEMENT
Filed Jan. 30, 1953     7 Sheets-Sheet 4

INVENTOR
*Eugene A. Sands*
BY
*Pennie, Edmonds, Morton, Barrows and Taylor*
ATTORNEYS Aug. 5, 1958

E. A. SANDS

2,846,593

LOGICAL COMPUTING ELEMENT

Filed Jan. 30, 1953

INVENTOR
*Eugene A. Sands*
BY
ATTORNEYS

Aug. 5, 1958

E. A. SANDS 2,846,593

LOGICAL COMPUTING ELEMENT

Filed Jan. 30, 1953

INVENTOR
Eugene A. Sands
BY
ATTORNEYS

Aug. 5, 1958        E. A. SANDS        2,846,593

LOGICAL COMPUTING ELEMENT

Filed Jan. 30, 1953        7 Sheets-Sheet 7

INVENTOR
*Eugene A. Sands*
BY
ATTORNEYS

United States Patent Office 2,846,593
Patented Aug. 5, 1958

2,846,593

LOGICAL COMPUTING ELEMENT

Eugene A. Sands, Mount Kisco, N. Y.

Application January 30, 1953, Serial No. 334,156

20 Claims. (Cl. 307—88)

This invention relates to computers and more particularly to logical elements for use in computers to generate logical functions from variable input data in terms of a plurality of input variables. The values of the digits in a plurality of binary numbers to be added or subtracted are typical examples of the variable input data which can be operated on by the logical elements of the invention in order to effect addition or subtraction of such binary numbers. The invention is not however limited to such operations, nor to numbers in the binary system. Within limitations which will be described later, the invention makes possible the performance of all the logical functions which can be performed by a relay comprising a coil and contact, and by combinations of such relays.

The invention provides a logical element comprising a saturable magnetic core and one or more windings linking the core, together with three or more current (or voltage) generators which are coupled to the winding or windings. In embodiments employing less than three windings per core, one of the windings is coupled to two or more of the current or voltage generators, which are energized at separate times. The generators are coupled to the windings to pass unidirectional pulses of current therethrough of polarities properly chosen, with reference to the relative orientations of the windings if two or more are provided, so that energization of at least two of the three generators will tend to magnetize the core in one direction while at least one other generator will magnetize it in the opposite direction. One of the said two generators is sufficient to saturate the core in one sense regardless of its previous condition of magnetization whereas the second thereof is incapable of reversing its condition of saturation, while said other generator is capable of saturating the core in the opposite sense regardless of its previous condition of magnetization. A load impedance is connected in series with the winding whose generator is incapable of reversing the state of magnetization of the core.

The generator and winding which are in series with the load impedance may be referred to in combination as the sensing field generator. Generators and windings which produce a saturating field of the same sense as the sensing generator may be referred to in combination as set field generators while generators and windings which produce a saturating field of the opposite sense may be referred to in combination as reset field generators.

The saturating field generators, whether set or reset, serve to introduce the data of the functions to be evaluated or to clear the elements of such data, and the sensing field generator reads the value of the function after the data thereof have been read in.

One or more of the logical elements of the invention may be combined together according to the complexity of the function being evaluated. The field generators for the information input, clear and sensing operations are energized in appropriate and usually repetitive time sequence by auxiliary apparatus for the supply of the input data, reading of the result, and storage of the output data.

The auxiliary apparatus may for example form part of a computing apparatus into which the logical elements of the invention may be built.

By means of the logical elements of the invention, any logical Or and any logical And function (or combination of such functions) of variables having each a possible zero and a possible non-zero value may be generated. The non-zero value may be referred to in all cases as unity, although the apparatus is not critical as to amplitudes of the signals employed for supply of the input data. The invention thus permits the generation of any switching function such as addition, subtraction, and coded decimal to decimal translation which can be represented in terms of Boolean algebraic symbols.

The invention will now be described in detail in terms of a number of exemplary embodiments and applications thereof by reference to the accompanying drawings in which.

Figure 1:
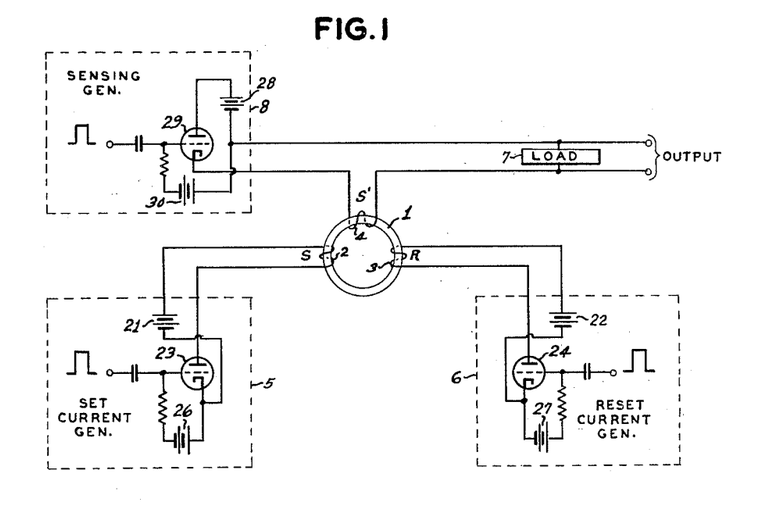
Fig. 1 is a schematic representation of the basic logical element of the invention.

In Fig. 1, a core 1 of saturable magnetic material is linked by three windings 2, 3 and 4. The core may be either a toroid wound from magnetic ribbon, or a stack of suitably punched laminations (such as E's and I's or DU's). The only criterion which must be observed is that the impedance of the sensing winding of the core must be high relative to the load when the core is in the reset state, and it must be low relative to the load when the core is in the set state. In this respect, a core with a relatively rectangular hysteresis loop is required. The number of turns on the sensing winding is determined by the required impedance which the core must present to the sensing generator when the core is in the reset state. The number of turns on the set and reset windings is determined by the amplitude of the current produced by set and reset current generators, and the ampere turns necessary to change the core from its reset to its set state (or equivalently from its set to its reset state) in a time determined by the rate at which the logical function is to be computed. (For methods of determining the impedance of a magnetic core and the factors which affect the impedance see "The behavior of rectangular hysteresis loop materials under current pulse conditions," E. A. Sands, Proceedings of the IRE, October 1952.)

The winding 2 connects with a set current generator 5, which comprises a switch and a source of unidirectional voltage or unidirectional current, presently to be described. When the switch is closed (by action of a switching signal, for example) the source is connected to the winding 2. The combination of the set current generator 5 and winding 2 constitutes a field generator which, when turned on by the closing of the switch in the generator 5, will saturate the core in one sense to a flux density which may be defined as a positive saturation flux density $+B_M$, regardless of the previous condition of magnetization of the core.

The winding 3 connects with a reset current generator 6 similar to the set current generator 5. The combination of the winding 3 and reset current generator 6 differs however from the combination of winding 2 and generator 5 in that the winding 3 and generator 6 together constitute a field generator which when turned on by closing of the switch in the generator 6 will saturate the core in the opposite sense to a saturation flux density $-B_M$, again regardless of its previous condition of magnetization. So long as the set and reset current generators supply the minimum of energy necessary to cause the core to be substantially saturated in the time allowed, the amplitudes of the voltages and currents of these generators are completely uncritical.

A winding 4 is connected into a series circuit including a load impedance 7 (for example a resistance) and a sensing generator 8, which comprises a source of unidirectional potential difference of low impedance relative to the load and a switch which when closed applies the potential difference to the series combination of the winding 4 and the load impedance 7. However, in embodiments of the invention combining two or more loads at least one of which is during the sensing time always connected to the sensing generator through a winding on a core in the set state, a unidirectional source of current may be used. Otherwise a unidirectional voltage source of low impedance relative to the load must be used for sensing.

Whether of the unidirectional voltage or the unidirectional current type, the sensing generator, like the set and reset current generators, includes a source of direct current potential difference and a switch, preferably of electronic type. In Fig. 1, the set and reset current generators are shown as including unidirectional voltage sources 21 and 22 in series with triodes 23 and 24, respectively cut off by bias sources 26 and 27. The tubes form switches which are closed when turned on by positive input pulses to their grids. Of course as switches these tubes present a substantial, finite impedance even when closed. The sensing generator comprises a similar plate voltage source 28 in series with a tube 29, which is also normally cut off by a bias source 30.

The sensing winding 4 and load 7 are in the cathode circuit of tube 29, producing a cathode follower connection so that any voltage appearing across the sensing winding and load directly subtracts from the net grid-cathode voltage occurring when an input signal to the grid of tube 29 is received. When the sensing winding exhibits a high impedance (with the core in the reset state), there is a large voltage drop across that winding, and hence very little plate current flows in tube 29, with a correspondingly small signal voltage appearing across the load impedance 7. When the sensing winding exhibits a low impedance (with the core in the set state), the voltage drop across the cathode is essentially the voltage across the load. This voltage is small compared to that across the cathode of tube 29 when the core is in the reset state. Hence a large plate current flows, and a large output signal is obtained across the load.

During set and reset times (i. e. upon energization of generators 5 or 6) a voltage appears across the terminals of the sensing winding 4. However, as long as the sensing generator switch tube 29 is kept cut off, no current flows in the sensing circuit. The voltage induced in the winding 4 during operation of the set current generator causes no trouble because it raises the cathode end of the winding 4, tending to cut the tube 29 further off. It will be remembered that the set and sensing field generators are so arranged as to produce fluxes of the same direction in the core. On the other hand the voltage induced in the sensing winding during operation of the reset current generator tends to lower the cathode of the tube 29. Therefore the bias source 30 of the sensing generator must be great enough to keep the tube 29 cut off even in the presence of a reset current pulse.

The combination of the generator 8 and winding 4 like the combination of winding 2 and generator 5, produces a field tending to magnetize the core towards positive saturation flux density. $B_M$. However the amplitude and time duration of the current produced in the winding 4 by the generator 8 when that generator is energized is never great enough to change the core from $-B_R$ to $+B_M$, $-B_R$ being the residual flux density to which the core 1 returns after being magnetized to negative saturation flux density $-B_M$.

The switches in the generators 5, 6 and 8 typically take the form of thermionic tube switches, which may themselves include auxiliary circuits to hold them closed for limited times in response to trigger signals supplied from auxiliary apparatus. Alternatively, the length of these closing times may be determined by the duration of switching pulses applied to them. As to set and reset generators 5 and 6, these times are so proportioned with reference to the constants of the windings 2 and 3 respectively, the values of the sources of potential difference contained in those generators and the properties of the core 1 that whenever generator 5 or 6 is enabled the core will be driven to saturation magnetization of one sign or the other, regardless of the previous condition of magnetization of the core. As to the sensing generator 8, the time of closure of its switch is differently proportioned, so that the core will not be driven from $-B_R$ to $B_M$. Thus the sensing generator 8 and its winding 4 cannot change the core from the reset to the set state.

In Fig. 1, the set winding 2 is identified as producing a flux of the same sign as the sensing winding 4 by the application of the symbol S to the winding 2, the symbol S' being applied to the winding 4. The winding 3 is identified as producing a flux of the opposite sign by means of the symbol R (reset).

It is to be noted that the relative geometrical orientations of the windings 2, 3 and 4 are immaterial to the invention. A single source of potential difference can of course be used for all three generators. The set and sensing windings 2 and 4 may moreover have a number of turns in common. Moreover by using set and reset switching arrangements which permit current to flow in either direction through a single winding, windings 2 and 3 can be common.

Figure 2:
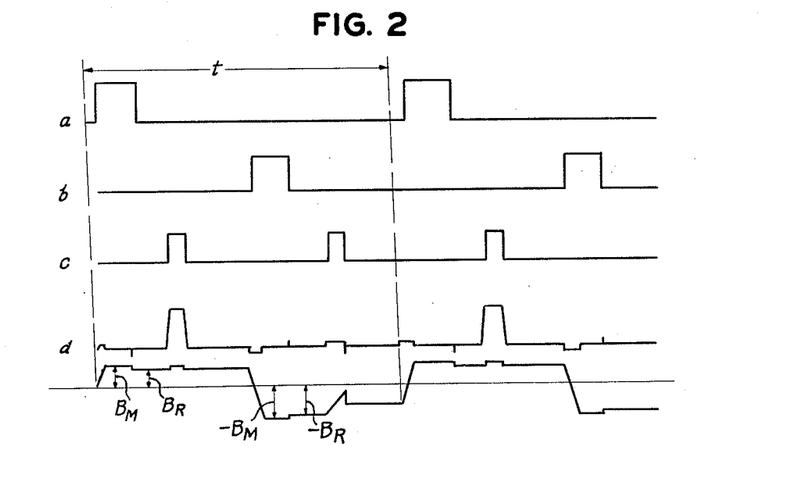
Fig. 2 is a set of idealized wave forms useful in explaining the operation of the circuit of Fig. 1.

The operation of the logical element of Fig. 1 is illustrated in Fig. 2 where wave forms $a$ and $b$ represent respectively periodic pulses of current sent through the windings 2 and 3 while wave form $c$ represents periodic input pulses of voltage to the grid of the sensing generator 8, one sensing generator pulse being developed for each pulse applied to either of the windings 2 and 3. Wave form $d$ represents the voltage appearing across the load 7. Generators 5, 6 and 8 are assumed to be triggered in this relative time sequence by auxiliary apparatus of conventional type. A complete cycle of operation is represented in Fig. 2 by the time interval $t$.

If the core 1 is initially assumed to be demagnetized as indicated in wave form $e$, wherein positive and negative flux densities are plotted upwardly and downwardly from a zero reference level, application of a pulse of current to the set winding 2 magnetizes the core to a positive saturation flux density $B_M$. The core is magnetized to $B_M$ before the end of the set current pulse. At the end of the set current pulse the core reverts to a positive residual flux density $B_R$ representing the "set" condition for the core. Of the voltage induced in winding 4 during the set current pulse, only a small part, indicated in wave form $d$, appears across the output load impedance 7 during the flux change from zero to $B_M$ because of the high impedance of the sensing generator 8 as compared to the output load impedance. The sensing generator is now turned on, as indicated in wave form $c$. The core, which is in the set condition, presents a very low impedance to the sensing generator voltage, which tends to drive the already saturated core farther towards positive saturation. Therefore the voltage of the sensing generator 8 appears primarily across the load impedance 7, as indicated in wave form $d$. The finite rise time of the output voltage is due to the leakage inductance of the core.

The next event that occurs in the cycle of operation is the turning on of the reset current generator 6, as indicated in wave form $b$. The reset current generator magnetizes the core to $-B_M$, and at the end of the reset generator current pulse the core reverts to negative residual flux density $-B_R$, which characterizes the "reset" condition of the core. The next time the sensing generator 8 is energized, the core exhibits a high impedance so that only a small voltage appears across the load 7. Most of the sensing generator voltage appears across the terminals of the winding 4, where it is employed in magnetizing the core from $-B_R$ towards $B_M$. The duration (or the amplitude) of the sensing generator voltage pulse is however such that the core is not driven to the positive flux density $+B_R$. At the end of the sensing voltage pulse the core reverts to an intermediate level of magnetization, from which it is shifted to the positive saturation flux density $B_M$ on the appearance of the next set current generator pulse, and the cycle is repeated.

Thus the core 1 of Fig. 1 has two stable conditions. The first is a set condition corresponding to $B_R$ resulting from energization of the set field generator comprising the set current generator 5 and set winding 2. The other is a reset condition corresponding to $-B_R$ resulting from energization of the reset field generator comprising the reset current generator 6 and reset winding 3. In the set condition, the impedance of the sensing winding 4 is small compared to that of the load 7, when the two are exposed in series to sensing pulses of the generator 8 which tend to magnetize the core in the same sense as do the pulses of the set field generator. In the reset condition, the impedance of the sensing winding 4 is high compared to that of the load, again to pulses from the sensing generator which tend to magnetize the core toward the set condition.

In view of the wave forms of Fig. 2 it is possible to state the limitations on the capacity of the logical elements of the invention to perform logical functions in the same way as do relays. These limitations are simply that neither the amplitude nor the time duration of the sensing current pulse sent through the sensing winding can be infinite, and that the sensing pulses must be unidirectional.

Figure 3:
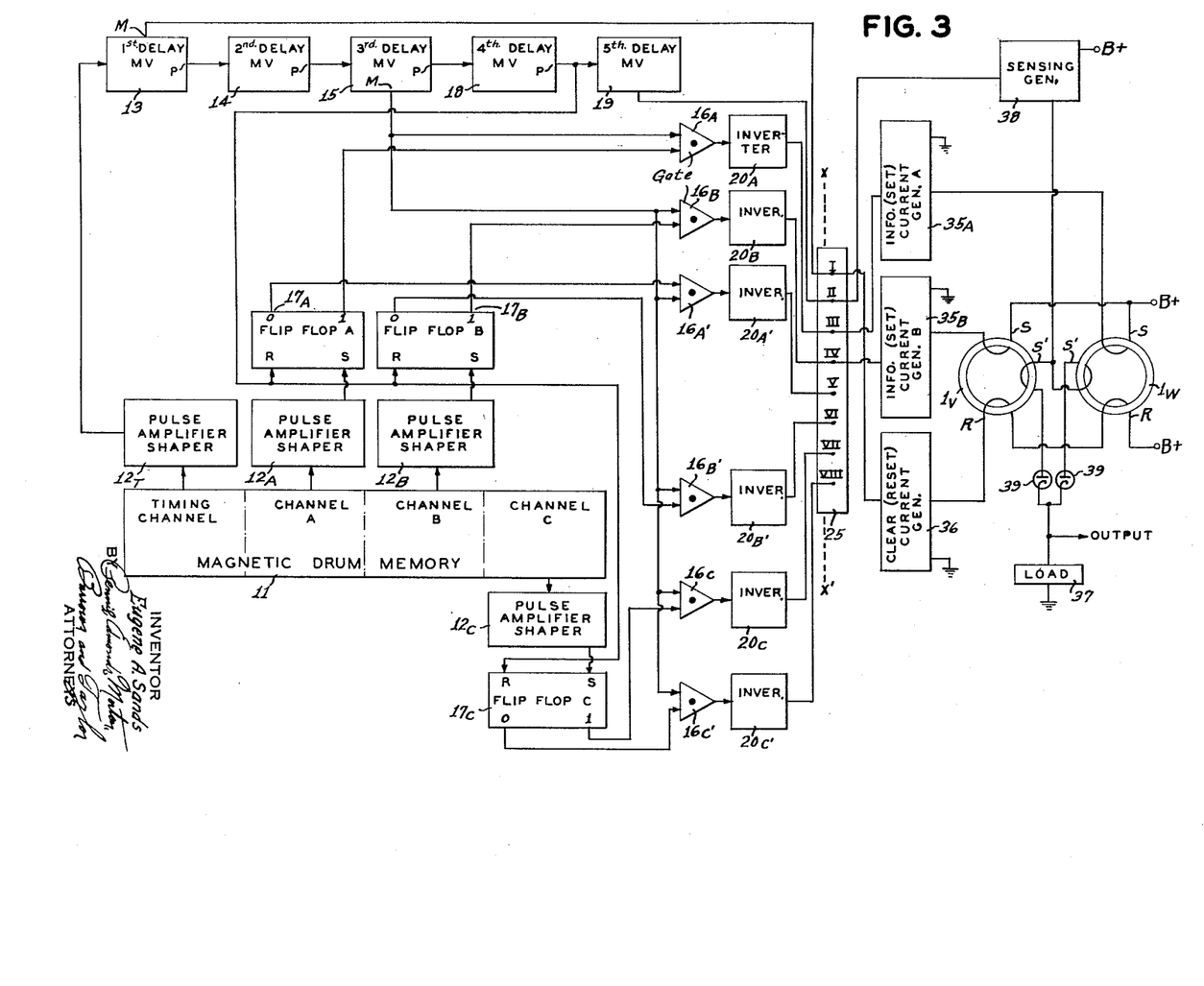
Fig. 3 is a diagrammatic representation of a combination of logical elements according to the invention for the solution of a logical function A$v$B (read "A or B"), together with appropriate auxiliary apparatus for supply of the input data corresponding to the values of the variables A and B, for sensing the value of the function as read in, and for clearing the circuit of the data read in preparatory to a renewed evalution of the same function with different values for the variables.
Figure 5:
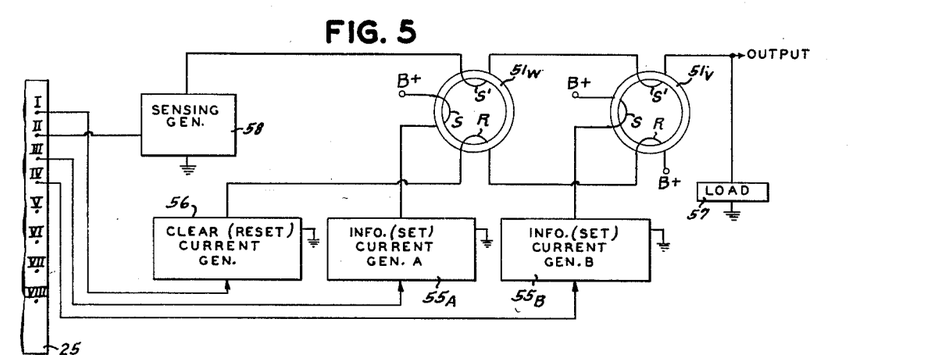
Fig. 5 is a diagrammatic representation of another combination of logical elements according to the invention as connected for solution of the logical function AB (read "A and B"). The circuit of Fig. 5 may be employed with the auxiliary apparatus shown to the left of the dotted line X—X' in Fig. 3.

Figs. 3 and 5 respectively illustrate applications of the logical element of the invention to the evaluation of the logical Or function A$v$B and to evaluation of the logical And function AB.

The meaning of the function A$v$B involving variables A and B each of which can have either zero value or a non-zero value (unity) is that the function has a unit (i. e. non-zero) value if either A or B or if both A and B have unit value, whereas the function has zero value if both A and B have zero value. The meaning of the And function AB involving similar variables A and B is that the function has unit value only if both of the variables A and B have unit value. For a discussion of the logical symbolism used and its manipulation see Claude E. Shannon's "The synthesis of two terminal switching circuits," vol. 28, Bell System Technical Journal, January 1949.

In Fig. 3 two logical elements are provided, each comprising the structure illustrated in Fig. 1, although certain parts of this structure are common to both logical elements. In Fig. 3 and in the subsequent Figs. 5–11 illustrating embodiments and applications of the invention, the number of lead lines required has been reduced by showing one end of each winding which forms part of a set or reset generator as connected to a B+ terminal outside the associated set or reset current generator. Accordingly each of the set and reset current generators is shown with a grounded terminal. This is consistent with the showing of Fig. 1. Similarly, the sensing voltage generators in Figs. 3 and 5–11 are shown with a grounded terminal, and the terminal of the load impedance remote from the sensing winding is shown in those figures as grounded also. Of course the B+ terminals of the set and reset field generator windings may belong either to common or separate sources of unidirectional voltage, forming part of those field generators.

In Fig. 3 two cores $1_W$ and $1_V$ are provided with a single reset current generator 36 connected to reset windings R on the two cores in series. The generator 36 effects a clearing operation to erase the input data from the cores after the operation of the sensing generator and before the operation of the set generators for data input. One set current generator $35_A$ is connected to a set winding S on core $1_W$ and a second set current generator $35_B$ is connected to a set winding S on core $1_V$. The generator $35_A$ serves for input to the cores of the values of the variable A, and the generator $35_B$ serves for input to the cores of the values of the variable B. A single sensing generator 38 connects with a load impedance 37 via sensing windings S' connected in parallel on the two cores. Separate rectifiers 39 are respectively connected in series with the sensing windings S' between the sensing generator and the load in order to isolate the two cores during operation of the set and reset generators.

The set current generators are controlled by triggering or switching signals representative of the values of the variables A and B, and the reset generators are controlled by triggering or switching signals derived from periodic timing pulses. These switching signals are supplied from suitable auxiliary apparatus, one form of which shown in Fig. 3 to the left of the line X–X' will presently be described.

In Fig. 3 energization of the reset generator 36 restores both cores to the reset condition of magnetization $-B_R$. With the cores in the reset condition, energization of either of the set (information) current generators $35_A$ and $35_B$, or of both, in accordance with unit value for either or both of the variables A and B, will result in the appearance of a substantial signal across the load 37 when the sensing generator 38 is thereafter energized. The combination of logical elements of Fig. 3 therefore serves to evaluate the function AvB in terms of any combination of values for the A and B variables.

Figure 4:
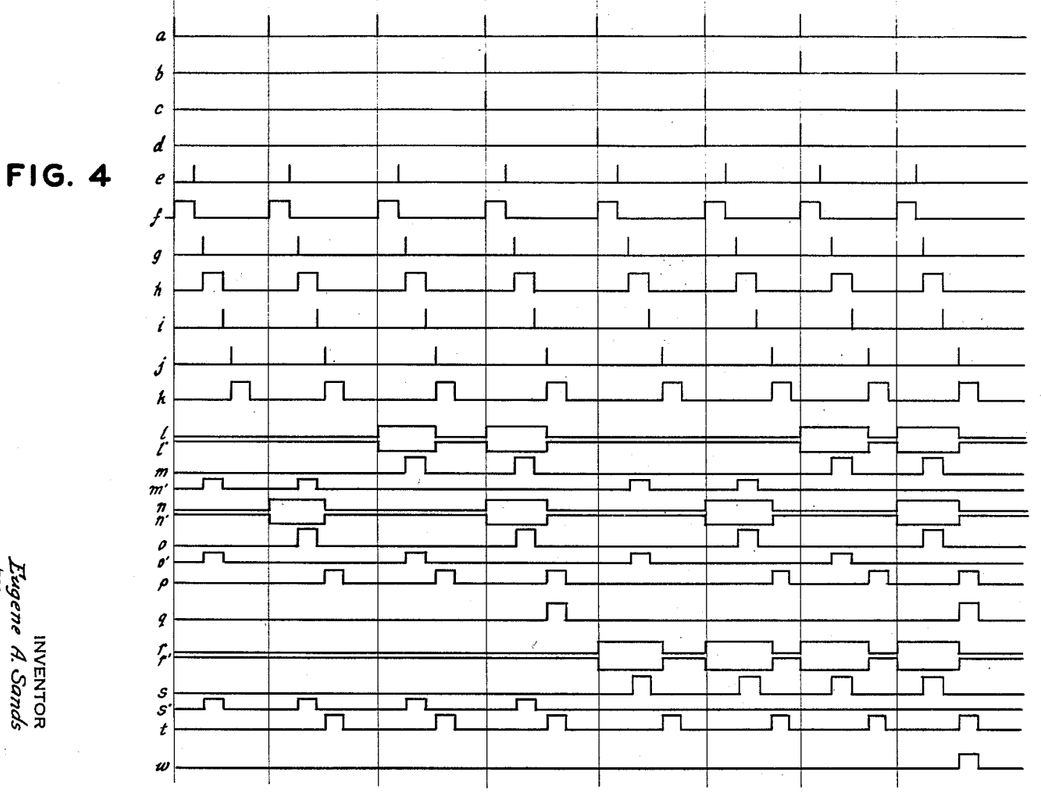
Fig. 4 is a diagram of certain wave forms useful in explaining operation of the embodiments of the invention shown in Figs. 3 and 5–11.

Fig. 3 further illustrates to the left of the dashed line X—X' thereof, auxiliary apparatus for operation of the generators $35_A$, $35_B$, 36 and 38 in appropriate time sequence and, as to generators $35_A$, $35_B$, in accordance with the values of the variables A and B under consideration. In this auxiliary apparatus the data to be evaluated is stored, together with a periodic time signal, on any suitable means such as a magnetic reproducer indicated at 11. The data may consist, for example, of a plurality of successive combinations of the permissible values of the variables A and B. One combination is evaluated for each cycle of operation. The periodic time signals which identify the separate cycles are shown at wave form $a$ in Fig. 4. Eight cycles of operation are shown in Fig. 4, and all possible combinations of input data for the variables A and B are shown at wave forms $b$ and $c$ in the first four cycles of wave form $a$. The timing signal is shown as occurring at the beginning of each cycle.

The reproducer unit 11 may include for example a drum or tape having three or more parallel tracks or channels thereon, one for the periodic time signals of wave form $a$ and one for each of the variables to be employed. It also includes separate playback transducers for these channels and means to bring the record medium past them. In Fig. 3 separate channels are provided for variables A, B and C, variable C being employed in certain further illustrative embodiments of the invention shown in the subsequent figures.

Unit value, in any one cycle of operation, for any of the variables recorded is indicated by the presence of a recorded signal at or near the time of the timing signal for that cycle, as indicated for the variables A, B and C in wave forms $b$, $c$ and $d$ of Fig. 4, respectively. Zero value in any one cycle for one of the variables is indicated by the absence of a recorded signal in that cycle at or near the time of the timing signal.

On the record medium of reproducer 11 the recorded signals representing incidents of unit value for the variables A, B, C, etc., must appear within a selected portion or "data phase" of the cycle with reference to the timing signal, as there recorded, in order that the switching signals derived from those incidents may appear at the switches of the saturation current generators of the logical elements in proper time relation to the switching signals developed from the timing signal for operation of the sensing and data clearing (reset) generators. In the example shown in Figs. 3 and 4, the "data phase" includes the phase of the timing signal, and the three sets of derivative switching pulses for the data input, sensing and clearing operations are caused to arrive at the generators of the logical elements in three separate portions of the cycle by the use of appropriate delay elements. Other phasing of the timing and data signals as recorded are of course possible.

In Fig. 4 light vertical lines coincident with the timing signals serve to indicate the limits of successive cycles in all wave forms. Of course the location although not the separation of these vertical lines is arbitrary.

The signals developed in the reproducer unit 11 for timing and A and B channels thereof are advantageously applied to amplifying and shaping circuits $12_T$, $12_A$ and $12_B$ respectively, which may be of conventional design, in order to make available for triggering purposes pulses of standard shape and amplitude. The timing channel is connected via such an amplifying and shaping circuit to the input of a delay multivibrator 13 which puts out an undelayed pulse-shaped signal at its terminal M. In the application of the invention illustrated in Fig. 3 this undelayed pulse is used as a switching signal for energization of the clear current generator 36, via terminal I on the terminal board 25 shown at the line X—X' separating the auxiliary apparatus from the logical circuits of the invention. The signal at the M terminal of the multivibrator 13 is shown at wave form $f$ in Fig. 4, and is seen to begin substantially simultaneously with the timing signal of wave form $a$.

A delayed output signal is provided by the multivibrator 13 at its terminal P, and this signal is illustrated at wave form $e$ of Fig. 4. The delayed output signal of wave form $e$ energizes a second delay multivibrator 14 whose delayed output signal at its terminal P is shown in wave form $g$. The signal of wave form $g$ is applied to a third delay multivibrator 15 having at its M terminal an undelayed output signal (wave form $h$) and a delayed output (wave form $i$) at its P terminal. The undelayed signal of multivibrator 15 is connected in parallel to gate circuits $16_A$ and $16_B$ which receive the A and B channel information via shaping circuits $12_A$, $12_B$ and flip-flop (e. g. Eccles-Jordan) circuits $17_A$ and $17_B$. The undelayed pulses $h$ from the M terminal of multivibrator 15 are the gating signal to gating circuits $16_A$ and $16_B$. The delayed output signal from the P terminal of multivibrator 15 is applied to a fourth delay multivibrator 18 whose delayed output signal is shown at wave form $j$ in Fig. 4. This delayed output signal energizes a fifth delay multivibrator 19 whose undelayed pulse is shown at wave form $k$. Wave form $k$ is employed in Fig. 3 to trigger the sensing generator 38 via terminal II on the board 25.

The flip-flop $17_A$ provides a positive, high level output (wave form $l$) at its 1 terminal each time the signal in the A channel of reproducer 11 has unit value, as is seen by comparing wave forms $l$ and $b$ of Fig. 4. Similarly, flip-flop $17_B$ provides a positive, high level output (wave form $n$) at its 1 terminal each time the signal in the B channel of reproducer 11 has unit value, as is seen by comparing wave forms $c$ and $n$. These high level outputs at the 1 terminals of the flip-flop begin with the appearance of the unit value A or B signals at the transducers of reproducer 11 (wave forms $b$ and $c$), and are terminated a fraction of a cycle later when the flip-flops are shifted to their opposite condition of conduction by the delayed output signal from the P terminal of the fourth multivibrator 18 (wave form $j$).

The signals at the 0 output terminals of the flip-flops are identical in form wtih the signals at their 1 terminals except that they are turned upside down. They are shown for flip-flops $12_A$ and $12_B$ at wave forms $l'$ and $n'$. The 0 terminals thus present a high level positive output during cycles when the variables in whose channels they are have zero value. These zero terminal flip-flop outputs are employed in the development of switching signals representative of A', B', etc., variables, and these A', B' switching signals may be applied to A', B' etc., saturation current generators as will be explained in connection with Fig. 6 for example.

In Fig. 3, the combination of wave forms $l$ and $h$ in the gate circuit $16_A$ permits a signal to emerge therefrom, and the output of this gate after inversion in an inverter $20_A$ is shown at wave form $m$. Its duration is that of the gating signal $h$. The flip-flop $17_B$ likewise produces a positive output at its 1 terminal each time the variable B in the B channel of recorder 11 has unit value, and this output is illustrated at wave form $n$. Wave form $n$ and the gating wave form $h$ combine in a gate circuit $16_B$ to produce an output illustrated at wave form $o$ after inversion in an inverter $20_B$.

The signals of wave forms $m$ and $o$ are applied respectively to the information current generators $35_A$ and $35_B$ of the AvB circuit of Fig. 3 via terminals III and IV on board 25. These signals are the switching signals by which the generators $35_A$ and $35_B$ are operated to set the cores. The signal obtained at the output impedance 37 is shown at wave form $p$. Wave form $p$ in its first four cycles of the timing wave form $a$ is a diagram of the function AvB for all combinations of the permitted zero and unit values of the variables A and B.

The various delay, gating and flip-flop circuits of Fig. 3 are provided in order to obviate the effect of small irregularities in the time relation of the A and B channel information with respect to the timing signal as these three signals are initially provided in the magnitude reproducer 11.

At the generators of the logical elements of Fig. 3, the data or read-in phase is seen to include the duration of the pulses of wave forms $m$ and $o$, i. e. the time duration of the pulses of wave form $h$. This read-in phase is followed by the sensing phase, which includes the duration of the pulses of wave form $k$. Lastly, or, otherwise considered, at the beginning of the next cycle, there occurs the clearing operation, whose phase is that of the pulses of wave form $f$.

Solution of the logical And function AB by means of the element of the invention is illustrated in Fig. 5, where a sensing generator 58 is connected to an output impedance 57 through the sensing windings S' in series on two cores $51_W$ and $51_V$. As in the case of Fig. 3, a reset current generator 56 connects with series-connected reset windings R of the two cores, and is used to clear the cores of input data after evaluation of the function for each cycle of operation.

Separate set current generators $55_A$ and $55_B$ connect each with a set winding S on one of the two cores and are used for input of the valves of variables A and B. Evidently, in order that energization of the sensing generator 58 may result in the appearance of a signal across the load impedance 57, both of the cores $51_W$ and $51_V$ must be magnetized to the set condition. Hence no output signal is obtained unless the A and B variables both have unity valve, and the two logical elements of Fig. 5 therefore evaluate the function AB.

Energization of the set, reset and sensing generators is achieved by the auxiliary apparatus of Fig. 3 to the left of the line X—X' therein, the circuit of Fig. 5 using the same outputs I, II, III and IV of that auxiliary apparatus as does the combination of logical elements shown to the right of line X—X' in Fig. 3. The output voltage AB across the load 57 of Fig. 5 is shown at wave form $q$ of Fig. 4.

Figure 6:
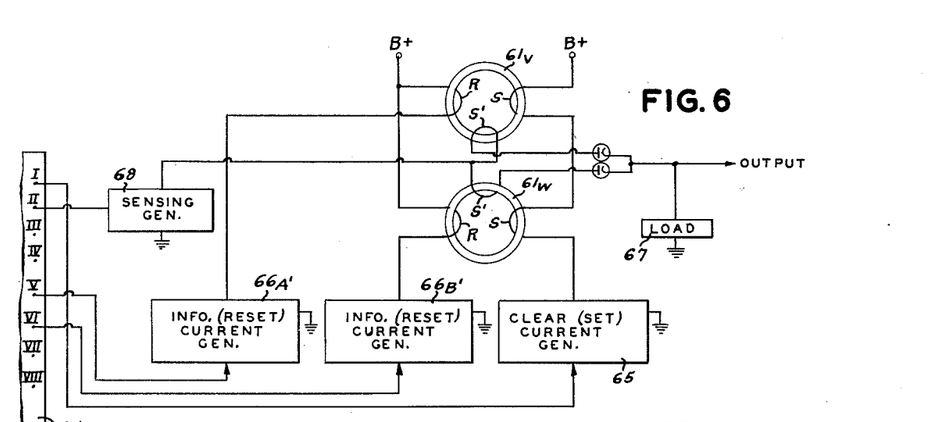
Fig. 6 is a diagrammatic representation of a further combination of logical elements according to the invention for the solution of the function A$v$B from variables A' and B', respectively equivalent to not-A and not-B. The circuit of Fig. 6 may be employed with the auxiliary apparatus shown at the left of the dotted line X—X' in Fig. 3.

One way of employing the logical elements of the invention for the solution of And and Or functions is to derive, in the auxiliary apparatus controlling the set and reset generators of those elements, from the circuit recorded values of the variables under investigation, trigger or switching signals which are applied to energize those generators as by closing the switches thereof. Under these conditions, an incident of unit value for a variable in the function under consideration may be employed to effect the setting of a core while the zero value for the variable results in a reset condition of a core, or vice versa, according as the trigger signals for unit values of the variables are applied to set or to reset generators. Other significances may however be attached to the signal currents which set and reset the cores of the elements. For example, alternative variables A', B', C', etc., may be generated (if they are not already available), the variables A', B', etc., being related to the variables A, B, as opposites, the unit value of A corresponding to the zero value of A' and so on. By suitable changes to the arrangement thereof the logical elements of the invention may be employed to evaluate And and Or functions of the variables A, B and C in terms of input variables A', B' and C'. Fig. 6 illustrates the use of the elements of the invention to evaluate the function AvB in terms of such variables A' and B'. The operation of the circuit of Fig. 6 depends upon the truth of the logical equivalence $$AvB = (A'B')'$$

The meaning of this logical equivalence is that either A or B is present (or both are present), unless both A and B are absent, i. e. unless not-A (i. e. A') and not-B (i. e. B') occur together, i. e. unless A' and B' do occur together In Fig. 6, a set current generator 65 connects with set windings S on two cores $61_W$ and $61_V$. The generator 65 is however to be used for the clear operation, and it is therefore connected to terminal I of the board 25. The periodic signal of wave form $f$ in Fig. 4 therefore places both cores in the set condition at the beginning of each cycle. Reset current generators $66_{A'}$ and $66_{B'}$ are connected each to a reset winding R of one of the two cores. A sensing generator 68 and its windings S' are connected in the same manner as in the embodiment of Fig. 3.

The reset generator $66_{A'}$ is actuated by switching by a switching signal obtained from termnial V of board 25, when the variable A' is of unit value, i. e. when the variable A is of zero value, and the reset generator $66_{B'}$ is actuated by a similar signal obtained from terminal VI of board 25. The reset generators are thus used for data input, and a set generator is used for the clear operation.

Referring again to wave forms $l'$ and $n'$ of Fig. 4, high level positive outputs corresponding to unit values of A' and/or B' variables are obtained at the 0 output terminals of flip-flops $17_A$ and $17_B$ in Fig. 3 respectively during cycles in which the variables A and/or B on the record medium of reproducer 11 are of zero value. As previously explained, the wave forms at the 0 terminals of the flip-flops are respectively equal to the reciprocals of wave forms $l$ and $n$.

The 0 terminals of flip-flops $17_A$ and $17_B$ connect respectively with gates $16_{A'}$ and $16_{B'}$, which also receive the gating signal of wave form $h$. Gating circuits $16_{A'}$ and $16_{B'}$ therefore produce, via inverters $20_{A'}$ and $20_{B'}$, switching signals similar to those of wave forms $m$ and $o$ except that the positive pulses thereof occur at the time of gating pulses (wave form $h$) during cycles in which the variables A and/or B of reproducer 11 have zero rather than unit value. The output of circuits $16_{A'}$ and $16_{B'}$ are shown after inversion at wave forms $m'$ and $o'$. It is the signals of wave forms $m'$ and $o'$ which actuate the reset generators $66_{A'}$ and $66_{B'}$ of Fig. 6 via terminals V and VI. The sensing and clearing operations are performed as before by the signals of wave forms $k$ and $f$, applied to terminals II and I.

It will be observed from wave form $p$ that the function AvB being evaluated by the apparatus of Fig. 6 in terms of A' and B' variables has unit value in all cycles except those in which the variables A and B are both absent.

Therefore signal outputs are observed across the load corresponding to the logical statement $AvB = (A'B')'$. The embodiment of the invention shown in Fig. 6 differs from that of Fig. 3 in that the input information is represented in terms of the variables A' and B' instead of A and B.

Similarly the function AB solved by the circuit of

Fig. 5 can be solved from A′ and B′ signals in view of the equivalence:

$$AB = (A'vB')'$$

To solve the function AB from A′ and B′ signals, it is sufficient to modify the circuit of Fig. 5 by employing the "clear" or timing signal on terminal I to actuate a set current generator connected to set windings S on the two cores in series, and to employ the A′ and B′ switching signals on terminals V and VI to actuate separate reset generators serving the information input function and connected each to a reset winding R on one of the two cores. An output signal will then be obtained, corresponding to unit value for both of the variables A and B, unless one (or both) of the variables A′ and B′ is present at unit value, i. e. unless one or both of the variables A and B is of zero value. It has now been shown that And functions and Or functions can be generated using either A, B input variables or A′, B′ input variables. This is of great importance in computing apparatus because either A, B, C . . . variables or A′, B′, C′ . . . variables (but not both) need be generated when using the cores of logical elements, thereby saving additional auxiliary equipment.

To generate a function such as $(AvBvC \ldots)$, separate cores may be provided for each variable with their sensing windings in parallel between a common sensing generator for a common load. To generate a function such as $(ABCD \ldots)$ separate cores for each variable may be again provided, with their sensing windings connected in series.

The logical element of the invention is not restricted however to the form shown in Fig. 1 including one set, one reset, and one sensing field generator. By adding additional set or reset windings to a single core, additional variables can be accommodated. In this way functions of the type $AvBvC \ldots$ can be evaluated with a single core, and functions of the type $ABC \ldots$ can also be so evaluated with one single core in terms of variables A′, B′, C′ . . . .

Figure 7:
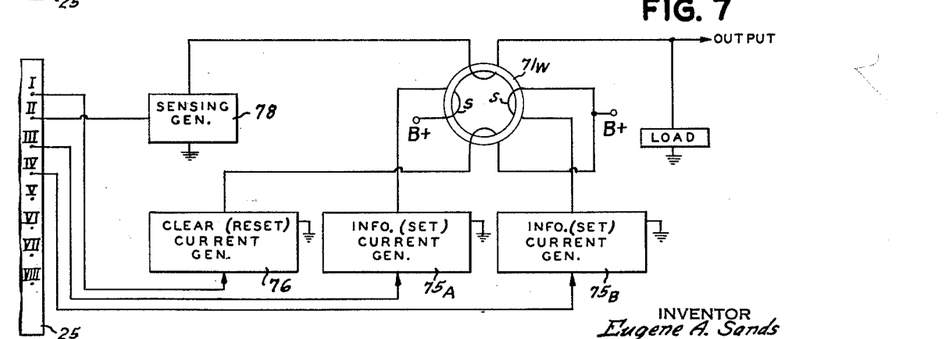
Fig. 7 is a diagrammatic representation of another application of the logical element of the invention for the solution of the logical function A$v$B by means of a single logical element according to the invention. The circuit of Fig. 7 may be employed with the auxiliary apparatus shown at the left of the dotted line X—X' in Fig. 3.

Fig. 7 illustrates the application of a single logical element according to the invention, so modified, to evaluate the function AvB. Two set current generators $75_A$ and $75_B$ connect with separate set windings S on a single core $71_W$ and are respectively controlled by switching signals representative of unit value A and B variables, from the III and IV terminals of board 25. A reset generator 76 and sensing generator 78 respectively perform the clear and sensing operations as in the embodiments of Figs. 3 and 5 by connection to terminals I and II. An output is obtained for unit value of either or both of the variables A and B as indicated at wave form p of Fig. 4.

A number of set (or reset) field generators can be provided on a single core by the use of a single set (or reset) winding, to which two or more set (or reset) current generators are connected in parallel with appropriate precautions against interaction between the current generators which are connected to drive a single winding. For set and reset current generators of the type above described which take the form of vacuum tubes biased past cut off except upon the appearance of the switching signals appropriate thereto, interaction is automatically prevented.

Figure 8:
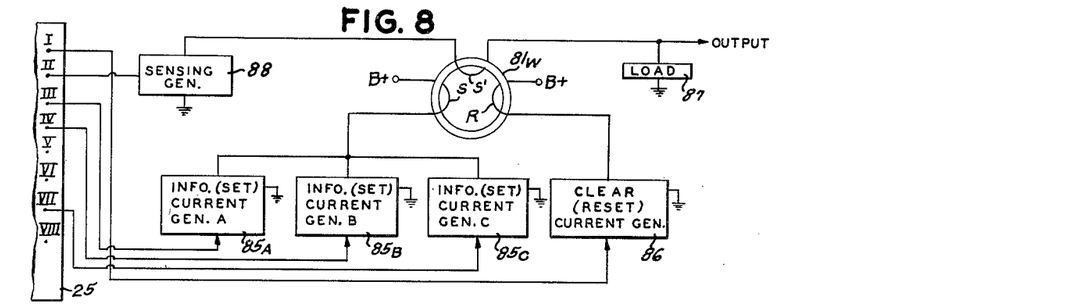
Fig. 8 is a diagrammatic representation of a single logical element according to the invention as employed to solve the function A$v$B$v$C. The circuit of Fig. 8 may be employed with the auxiliary apparatus shown at the left of the dotted line X—X' in Fig. 3.

Such an embodiment of the invention is illustrated in Fig. 8, which evaluates the function AvBvC. In Fig. 8 three set current generators $85_A$, $85_B$ and $85_C$ connect to a single set winding S on a core $81_W$. These generators respectively connect to terminals III, IV and VII from which they receive A, B, and C switching signals. Referring again to Fig. 3 to the left of the line X—X′ thereof, it will be seen that C and C′ signals are provided at terminals VII and VIII of board 25 from a C-channel in the reproducer 11 via circuit components similar to those employed in the generation of A, A′, B, and B′ signals provided to terminals III to VI. The values of the recorded C variable are shown at wave form d of Fig. 4 while the outputs of the 1 and 0 terminals of the corresponding flip-flop $17_C$ are shown at wave forms r and r′ and the inverted outputs of the C gate circuits $16_C$ and $16_{C'}$ are shown at wave forms s and s′.

With A, B and C switching signals at terminals III, IV and VII in accordance with variables A, B and C as shown at wave forms b, c and d in Fig. 4, the signal across the output load 87 is in accordance with wave form t, an output signal being obtained whenever any one or more of the variables A, B and C recorded in the reproducer 11 is of unit value. The core $81_W$ is put into the reset condition at the beginning of the cycle by the reset generator 86 and the occurrence of unit value for any one of the variables A, B and C suffices to restore it to the set condition prior to operation of the sensing generator 88.

By connecting a number of current generators in parallel to a single winding to produce a plurality of reset field generators and by providing a single set field generator, functions of the form ABC may be evaluated on a single element according to the invention in terms of A′, B′, and C′ variables, in view of the equivalence:

$$ABC = (A'vB'vC')'$$

Figure 9:
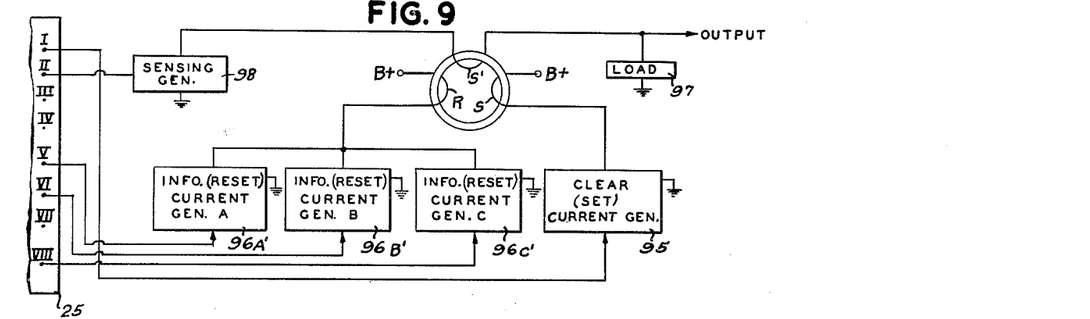
Fig. 9 is a diagrammatic representation of an embodiment of the logical element of the invention as employed to solve the logical function ABC from input variables A', B' and C' representing respectively not-A, not-B and not-C. The circuit of Fig. 9 may be employed with the auxiliary apparatus shown at the left of the dotted line X—X' in Fig. 3.

The circuit of Fig. 9 for evaluating the function ABC in this manner resembles that of Fig. 8 except that the paralleled generators are reset field generators while the single generator is a set field generator, the reverse of the arrangement of Fig. 8. In Fig. 9, the reset current generators, identified as $96_{A'}$, $96_{B'}$ and $96_{C'}$ in view of the switching signals on which they are to operate, are respectively connected to the A′, B′ and C′ terminals V, VI and VIII of the board 25 whereas the single set generator 95 which establishes the initial condition of the core at the beginning of the cycle is connected to terminal 1.

The core of the element of Fig. 9 is thus brought initially to the set state and is reset during any given cycle of operation by the occurrence of any one or more of the signals A′, B′ and C′ at unit value. An output signal is therefore obtained across the load 95 only on the coincidence of the recorded signals A, B and C at unit value, as indicated in wave form u.

Figure 10:
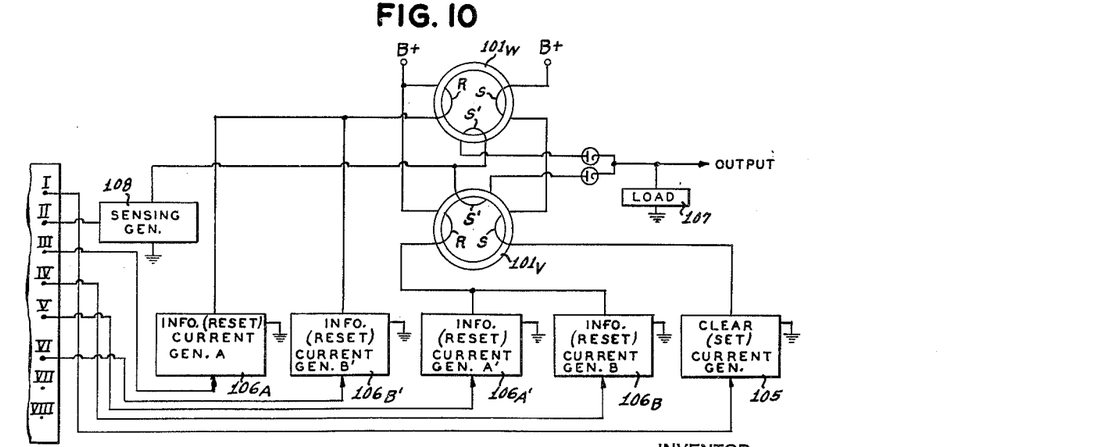
Fig. 10 is a diagrammatic representation of an application of the logical element of the invention to the addition of two one-digit binary numbers A and B. The circuit of Fig. 10 may be employed with the auxiliary apparatus shown at the left of the dotted line X—X' in Fig. 3.

Fig. 10 illustrates a combination of logical elements according to the invention for the evaluation of a slightly more complex function. The embodiment of Fig. 10 performs addition of two one-digit binary numbers A and B each having, of course, possible values of zero and one.

The sum of the numbers A and B, which will be designated S″, may be written as follows:

$$S'' = (AB')v(A'B)$$
$$= (A'vB)'v(AvB')'$$

This means that S″ has unit value whenever the number A has unit value and the number B has zero value or when the number B has unit and the number A has zero value. Fig. 10 evaluates the sum $(AB')v(A'B)$ by generating the equivalent function $(A'vB)'v(AvB')'$. In Fig. 10 two logical elements are employed having separate cores $101_W$ and $101_V$ and each carrying three windings which with appropriate current generators make up set, reset and sensing field generators. The sensing windings are connected in parallel between a sensing generator 108 and a load 107 as in the embodiment of Fig. 3. A set current generator 105 connects with separate set windings S on the two cores and is actuated by the cyclical signal at wave form e of Fig. 4 to place both cores in the set condition at the beginning of each cycle. Two reset current generators $106_A$ and $106_{B'}$ are connected in parallel to the reset winding of one core $101_W$ while two similar reset current generators $106_{A'}$, $106_B$ are similarly connected in parallel to the reset winding of the other core $101_V$. The reset current generators are connected in the order just named to terminals III, VI, V and IV.

At the beginning of the cycle both cores are in the set state. If, in a given cycle, of the variables A and B recorded in the reproducer 11 either A has unit value or B has zero value (corresponding to unit value for B'), the core $101_W$ will be reset, giving to the function as a whole evaluated at the load 107 unit value. If the recorded variables A and B have instead respectively the values zero and unity (A'=1, B'=0) the core $101_V$ will be reset, with a similar output. The circuit therefore generates the function (AB')$v$(A'B). The cases A=1, B=0 and A=0, B=1 are mutually exclusive so that although the circuit is adapted to evaluate an Or function of unit value for three combinations of inputs, only two combinations of inputs can be presented to it.

The logical element of the invention may be employed not only in three-step systems of the type illustrated in Fig. 3 in which the operating cycle comprises a clear step, an information input step and a sensing step, but also in two-step systems in which the only steps performed are read-in and sense. For this type of operation there must be positive indication of the presence or absence of each variable appearing in the logical function being generated, whether that variable appears in its unprimed or in its primed form. Separate elements are provided corresponding to each primed variable and to each unprimed variable, with saturation current generators in equal number. The saturation current generators and the windings are so connected that in the course of the data input phase of the cycle each core is placed in the set state if and only if the variable associated therewith has unit value. Each saturation current generator is connected to two windings in series, disposed on the cores of two elements. With one of its windings each saturation current generator forms a set field generator and with the other it forms a reset field generator. The core set by the generator identifies the logical element associated with the variable which, when of unit value, actuates the generator. The core reset by the generator identifies the logical element associated with the opposite variable.

Figure 11:
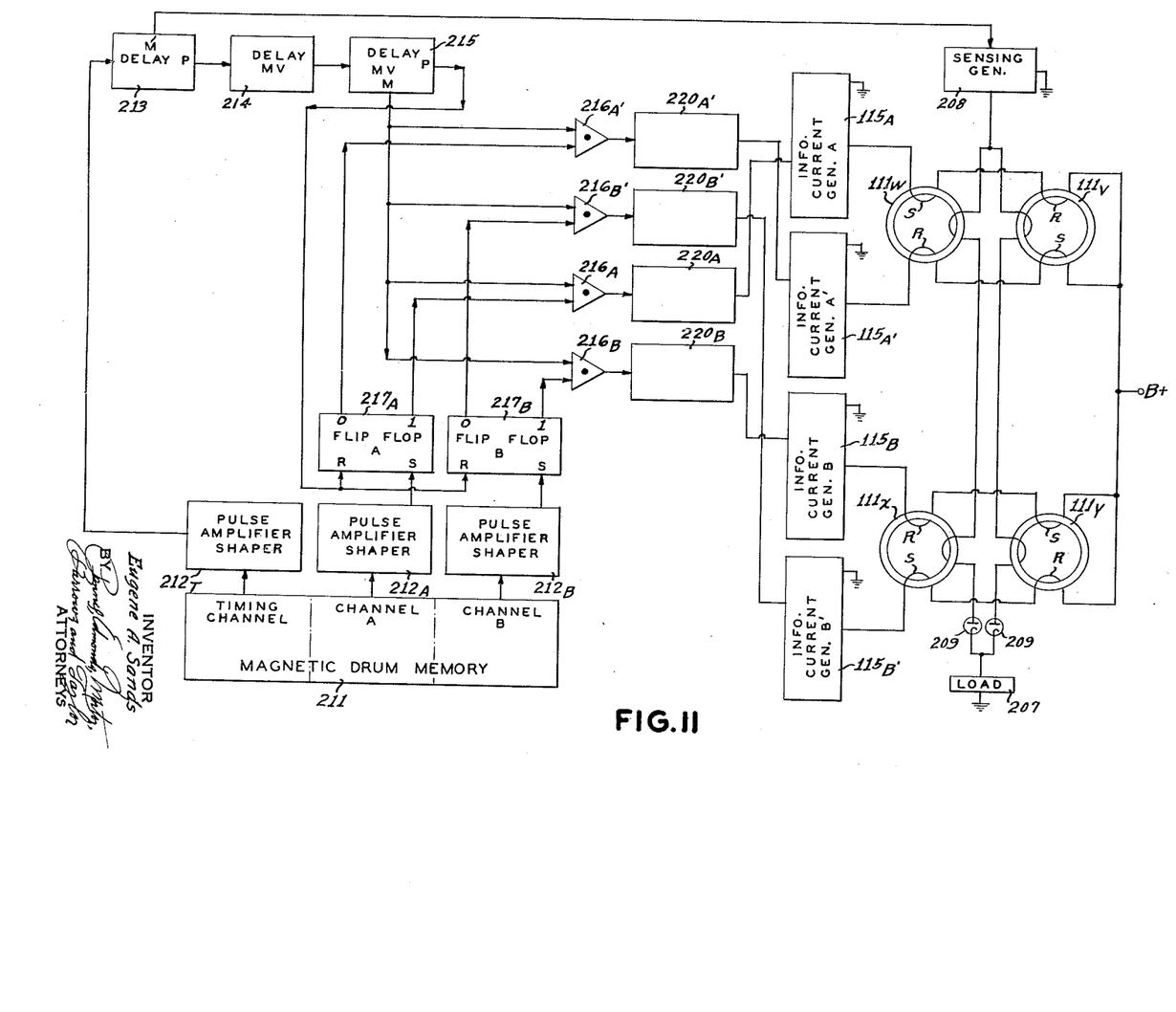
Fig. 11 is a diagrammatic representation of the application of the logical elements of the invention to the same problem of binary addition as that of Fig. 11, but in a circuit whose cycle contains only read-in and sensing steps, together with appropriate auxiliary apparatus for supply of the necessary input data signals.

Fig. 11 illustrates the application of the logical elements of the invention to the solution of the same addition function described in connection with Fig. 10, but in a two-step operating system. In Fig. 11 a reproducer 211 contains three channels in which are respectively recorded a cyclical timing signal and the values of A and B variables. The outputs picked up from these channels are applied to pulse shaping circuits $212_T$, $212_A$ and $212_B$ similar to the shaping circuits 12 of Fig. 3. The shaping circuit in the timing channel feeds a delay multivibrator 213 whose undelayed output terminal M connects with a sensing generator 208. The delayed output of the multivibrator 213 is passed through two further delay multivibrators 214 and 215. In the third delay multivibrator 215 an undelayed output is taken as a gating signal, once in every cycle, to gating circuits $216_A$, $216_B$, $216_{A'}$ and $216_{B'}$. These gating signals define a read-in phase suitably displaced in the cycle from the sensing phase defined by the output of the multivibrator 213.

Intelligence signals to the gating circuits are derived from the A- and B-channel shaping circuits $212_A$ and $212_B$ in flip-flop circuits $217_A$ and $217_B$, each having a 1 terminal energized for unit value of its associated variable A or B and a zero terminal energized for zero value of its associated variable. The outputs of the gating circuits may be inverted if necessary in appropriate circuits $220_A$, $220_B$, $220_{A'}$ and $220_{B'}$.

Accordingly in each cycle a unit voltage switching signal appears at the output of one of the circuits $220_A$ and $220_{A'}$ according as the recorded variable A is of unit or zero value, and a second unit value switching voltage appears at the output of one of the inverter circuits $220_B$ and $220_{B'}$ according as the recorded variable B is of unit or zero value.

For evaluation of the sum function $$S''=(AB')v(A'B)$$

four logical elements are provided including cores $111_W$, $111_V$, $111_X$ and $111_Y$. The sensing voltage generator 208 is connected with two parallel pairs of series-connected sensing windings S', one on each of the cores, and these parallel circuits connect with a load impedance 207 via rectifiers 209 as in the embodiment of Fig. 3. The sensing windings of cores $111_W$ and $111_X$ form one of these parallel circuits while those of cores $111_V$ and $111_Y$ form the other. Four saturation current generators are provided, one for each of the switching signal variables A, A', B and B'. The generator $115_A$ connects with a set winding on core $111_W$ and with a reset winding on core $111_V$. Generator $115_{A'}$ connects with a reset winding on core $111_W$ and with a set winding on core $111_V$. Generator $115_B$ connects with a reset winding on core $111_X$ and with a series connected set winding on core $111_Y$. Lastly generator $115_{B'}$ connects with a set winding on core $111_X$ and with a reset winding on core $111_Y$.

It is in the nature of the variables under consideration that unit values for the variables A and A' are mutually exclusive and that unit values for the variables B and B' are also mutually exclusive.

Each of the saturation current generators is therefore at once an element of a set field generator and of a reset field generator. From the nature of these eight field generators, indicated by the legends S and R on the windings thereof, it is apparent that a low impedance path can exist between the sensing generator and the load for only two combinations of input variable values, namely unit value for A and unit value for B', or unit value for A' and unit value for B. Unit value for A of course implies zero for A' and unit value for B implies zero value for B'. An output signal will therefore be obtained in either of the events AB' and A'B, in accordance with the logical function being evaluated, and in no other event.

The logical element of the invention may also be embodied in circuits employing a core with two rather than three windings or even with a single winding, two or more of the set, reset and sensing voltage or current generators being coupled to a single winding on the core. Embodiments of the invention employing two and one winding are shown in Figs. 12 and 13, respectively.

Figure 12:
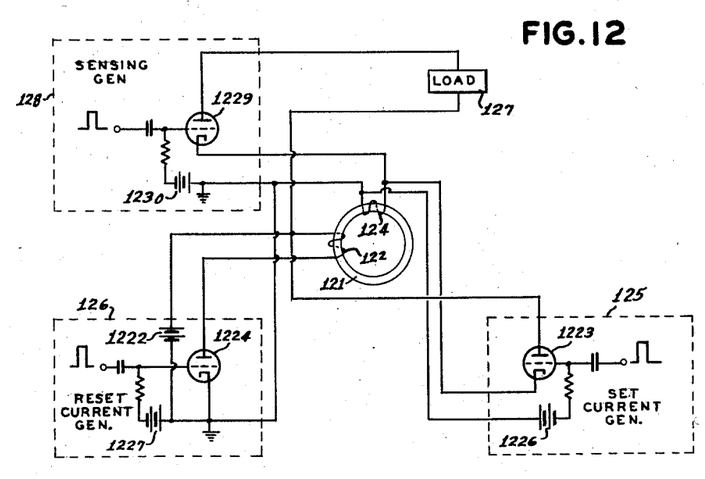
Fig. 12 is a schematic representation of an alternative form of logical element according to the invention, employing two instead of three windings on a common magnetic core.
Figure 13:
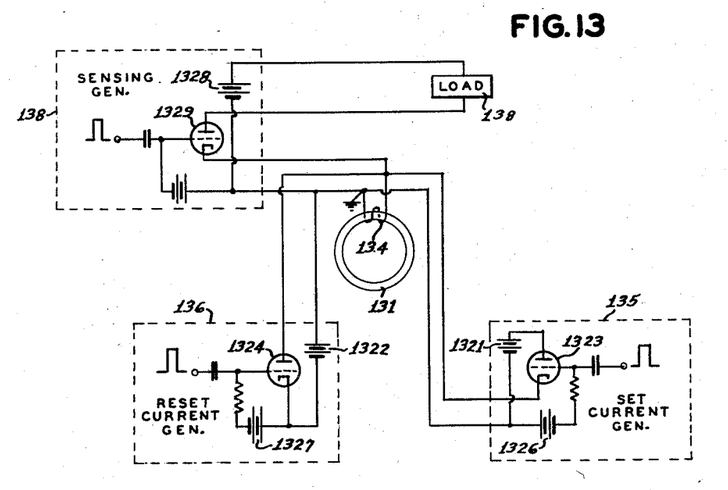
Fig. 13 is a schematic representation of a further alternative form of logical element according to the invention employing a single winding.

In Fig. 12 a core 121 is linked by two windings 122 and 124. The winding 124 is employed alternatively with a set current generator 125 and with a sensing generator 128 to form set field and sensing field generators. The winding 122 is employed with a reset current generator 126 to form a reset field generator.

The set current generator comprises a triode 1223 normally cut off by a bias source 1226, and a unidirectional voltage source 1222, shown as located in the reset current generator 126. When tube 1223 is turned on, by an input signal to its control grid, plate current flows through the winding 124 to drive the core to a condition of saturation defined as positive saturation flux density $+B_M$, after which the core returns to a positive residual flux density $+B_R$.

The reset current generator 126 comprises a triode 1224, normally cut off by a bias source 1227, and a unidirectional voltage source 1222. When the tube 1224 is turned on by means of a positive pulse applied to its control grid, plate current flows through the winding 122 to drive the core to the opposite condition of saturation defined as negative saturation flux density $-B_M$, after which it returns to a negative residual flux density $-B_R$.

The sensing generator comprises a triode 1229, normally cut off on its grid by a bias source 1230 and the same unidirectional voltage source 1227. A load impedance 127, for example a resistance, is connected in the plate circuit of tube 1229. The winding 124 is connected in the cathode circuit of tube 1229 to carry the plate current of that tube in the same direction as the plate current of tube 1223. However the amplitude and time duration of the current produced in the winding 124 by the sensing generator 128 when tube 1229 is turned on is never great enough to change the core from its negative residual flux density $-B_R$ to positive residual flux density $+B_R$. In this embodiment, the load is shown in the plate circuit of triode 1229, unlike the embodiment of Fig. 1, in which the load is shown connected in the cathode circuit of the sensing generator triode. Either method of connection can be used in each case. However, by placing the load in the plate circuit, the restriction on making the core impedance in the reset state high relative to the load impedance need no longer be observed. In fact, in many cases, the load impedance can be greater than the core impedance in the reset state. In the embodiment of Fig. 12, the conditions which must now be observed are as follows: (1) During sensing, when the core is in the reset state, the voltage across the sensing winding must be sufficiently great that only a relatively small amount of current is permitted to flow. As explained before, the current is limited because of the large negative feed back produced by the voltage across the sensing winding. (2) During sensing, when the core is in the set state, the voltage across the sensing winding must be sufficiently small to permit a relatively large amount of current to flow.

In the embodiment of Fig. 13 a core 131 is linked by a single winding 134. The core may be put in the set state $+B_R$ by a set current generator 135 comprising a triode 1323 normally cut off by a bias source 1326 and a unidirectional voltage source 1321. The core may be placed in the reset state $-B_R$ by operation of a reset current generator 136, comprising a unidirectional voltage source 1322 and a triode 1324 normally cut off by a bias source 1327. The reset current generator is connected to send the plate current of tube 1324 through the winding 124 in a direction opposite to that of the plate current of tube 1323 in the set current generator. The same conditions on the impedance level of the core stated previously in reference to Fig. 12 hold for this case.

In the embodiment of Fig. 13 the sensing generator comprises a source of unidirectional voltage 1328 and a triode tube 1329 normally cut off by a bias source 1330. The output impedance 138 is connected in the plate circuit of tube 1329, and the winding 134 is connected in its cathode, to receive its plate current in the same direction as that of tube 1323 of the set current generator. The impedance of the winding 134 is low relative to that of the load 138 when the core is in the set state and high relative thereto when the core is in the reset state.

It has been stated hereinabove that in all embodiments of the logical element of the invention impedance of the sensing winding should be large compared to the load when the core is in the reset state and small compared thereto when the core is in the set state. The impedance presented by the sensing winding may be said to be equivalent to a non-linear resistance in parallel with a non-linear inductance, these two ingredients of impedance varying with the current flowing through the winding and with the magnetic state of the core. The exact statement of the sensing winding impedance is dependent on the nature of the magnetic material employed for the core (e. g. its saturation flux density) on the length and cross-section of the core and on the number of turns in the sensing winding among other factors. Qualitatively however it may be stated that with core materials having relatively rectangular hysteresis loops such as are desired for use in the invention, the process of reversing the state of magnetization of the core is one involving substantial dissipation of energy, and that for this reason the impedance looking into the terminals of the sensing winding will be larger when the core is in the reset state than when it is in the set state. It will be remembered that the sensing field generator produces a flux of the same sign as does the set field generator. When the core is in the reset state, the impedance of the sensing winding will therefore include a large resistive component representing energy input to the core, while in its set state there will be little or no energy input to the core.

The embodiments of the invention illustrated in Figs. 3–11 may all be constructed from the logical elements of the invention shown in Figs. 12 and 13 as well as from that of Fig. 1. While the invention has been described in terms of a number of preferred embodiments, numerous variations and modifications thereof are possible within the scope of the invention as set forth in the appended claims. Of course for example pentodes may be used in place of the triode switching tubes which have been illustrated.

I claim:

1. A logical element comprising a saturable magnetic core, at least one winding linking the core, three switches, a load impedance, and one or more sources of unidirectional voltage, a first of the switches being connected with one of the windings and sources into a first series circuit capable, when closed, of saturating the core in one sense regardless of its previous condition of magnetization, a second of the switches being connected with one of the windings and sources into a second series circuit capable, when closed, of saturating the core in the opposite sense regardless of its previous condition of magnetization, the third of said switches being connected with the load impedance and with one of the windings and sources into a third series circuit incapable, when closed, of reversing the condition of saturation of the core.

2. A logical element comprising a saturable magnetic core, at least one winding linking the core, three multielectrode vacuum tubes, means to bias said tubes to cut off, at least one source of unidirectional plate voltage, and a load impedance, a first of said tubes being connected with one of the windings and sources into a first series circuit capable, upon unbiasing of said first tube, of saturating the core in one sense regardless of its previous condition of magnetization, a second of said tubes being connected with one of the windings and sources into a second series circuit capable, upon unbiasing of said second tube, of saturating the core in the opposite sense regardless of its previous condition of magnetization, the third of said tubes being connected with one of the windings and sources and with the load impedance into a third series circuit incapable, upon unbiasing of said third tube, of reversing the condition of saturation of the core.

3. A logical element comprising a saturable magnetic core, at least one winding linking the core, and three separate means to energize at least one of said windings with currents capable as to two of said means of saturating the core in opposite directions regardless of its previous condition of magnetization and incapable as to the third of said means of reversing the condition of saturation of said core.

4. In combination, a body of ferromagnetic material, at least one conductor disposed adjacent the body in position to send flux through the body, a load impedance, and three separate means to drive currents through at least one of said conductors, two of said means being adapted to drive currents through said conductors in such directions and of such magnitude and duration as to magnetize said body to saturation in substantially opposite directions regardless of its previous condition of magnetization, the third of said means having said load impedance in series therewith and being incapable of reversing the condition of saturation of said body.

5. A logical element comprising a saturable magnetic core, three windings linking the core, three multielectrode vacuum tubes, means to bias said tubes to cut off, at least one source of unidirectional plate voltage, and a load, a first of said tubes being connected with one of said sources and with a first of said windings into a first series circuit capable, upon unbiasing of said first tube, of saturating the core in one sense regardless of its previous condition of magnetization, a second of said tubes being connected with one of said sources and with a second of said windings into a second series circuit capable, upon unbiasing of said second tube, of saturating the core in the opposite sense regardless of its previous condition of magnetization, the third of said tubes being connected with one of said sources, with said load and with the third of said windings into a third series circuit incapable, upon unbiasing of said third tube, of reversing the condition of saturation of the core.

6. A logical element comprising a saturable magnetic core, three windings linking the core, three switches, a load impedance and one or more unidirectional voltage sources, a first of the switches and windings being connected with one of the sources into a first series circuit capable, when closed, of saturating the core in one sense regardless of its previous condition of magnetization, a second of the switches and windings being connected with one of the sources into a second series circuit capable, when closed, of saturating the core in the opposite sense regardless of its previous condition of magnetization, the third of said switches and windings being connected with the load impedance and one of the sources into a third series circuit incapable, when closed, of reversing the saturation of the core.

7. A logical element comprising a saturable magnetic core, three windings linking the core, three switches, an impedance, and one or more sources of direct current potential difference, two of said switches being connected with two of said windings and with at least one of said sources into two separate series circuits each including a winding, switch and source, said two circuits tending to magnetize said core in opposite senses, the third of said windings and switches being connected with one of said sources and with said impedance into a third series circuit, said first and second circuits being so proportoned that each when energized by the closing of its switch is capable of saturating the core regardless of its previous condition of magnetization, the third of said circuits being incapable of reversing the saturation of the core.

8. A logical element comprising a saturable magnetic core, three windings linking the core, and means to energize said windings with currents capable as to two of said windings of saturating the core in opposite directions regardless of its previous condition of magnetization and as to the third of said windings incapable of reversing the saturation of said core.

9. In combination; three magnetic field generators each including a unidirectional source of voltage, a switch and a conductor, two of said generators being adapted when energized by the closing of their respective switches to generate substantially oppositely directed magnetic fields in a common region of space; and a ferromagnetic body disposed in said space, said two generators being adapted to drive said body to substantially saturated opposite conditions of magnetization regardless of its previous condition of magnetization, said third generator being adapted to generate a field in said space substantially parallel to the field of one of said two generators but of intensity and time duration insufficient to reverse the condition of saturation of said body.

10. In combination, a body of ferromagnetic material and three generators of magnetic field including each a source of direct current potential difference, a switch and a conductor adjacent said body, one of said generators including a resistance in series with its said conductor, the second and third of said generators being adapted when energized by the closing of their respective switches to generate substantially oppositely directed saturating fields in said body regardless of the previous condition of magnetization of said body, the first of said generators being incapable of reversing the condition of saturation of said body.

11. A circuit for the evaluation of a logical Or function involving two variables of possible zero and unit values, said circuit comprising two saturable magnetic cores, two positive saturation field generators coupled one with each of said cores, a negative saturation field generator coupled with both of said cores, and two positive sensing field generators coupled one with each of said cores, said sensing field generators including a common load impedance.

12. A circuit for the evaluation of a logical And function involving two variables of possible zero and unit values, said circuit comprising two saturable magnetic cores, two sensing field generators having a switch in common and having separate series-connected windings one on each of said cores, two set field generators including each one winding on one of said cores, and two reset field generators having a switch in common and having series-connected windings one on each of said cores.

13. A circuit for the evaluation of a logical Or function involving two variables of possible zero and unit values, said circuit comprising two saturable magnetic cores, two sensing field generators having a switch in common and having parallel connected windings one on each of said cores, two reset field generators having separate windings connected one on each of said cores, and two set field generators having a switch in common and having series-connected windings one on each of said cores.

14. A circuit for the evaluation of a logical Or function involving two variables of possible zero and unit values, said circuit comprising a saturable magnetic core, a sensing field generator including a winding linking said core, a reset field generator including a winding linking said core, and two set field generators including separate windings linking said core.

15. A circuit for the evaluation of a logical Or function involving three variables of possible zero and unit values, said circuit comprising a saturable magnetic core, a sensing field generator including a winding linking said core, a rest field generator including a winding linking said core, and three set field generators including a common winding linking said core.

16. A circuit for the evaluation of a logical And function involving three variables of possible zero and unit values, said circuit comprising a saturable magnetic core, a sensing field generator including a winding linking said core, a set field generator including a winding linking said core, three reset field generators including a common winding linking said core, and means to close the switches of said reset generators for zero values of said variables respectively.

17. A logical element comprising a saturable magnetic core, two windings linking the core, three switches, at least one source of unidirectional voltage, and a load, a first of said switches being connected with one of said sources and with one of said windings into a first series circuit capable, when closed, of saturating the core in one sense regardless of its previous condition of magnetization, a second of said switches being connected with one of said sources, with said load, and with said one of said windings into a second series circuit producing in said core, when closed, a flux of the same direction as that produced by said first circuit, said second circuit being incapable of reversing the condition of magnetization of the core, the third of said switches being connected with one of said sources and with the other of said windings into a series circuit capable, when closed, of saturating the core in the opposite sense regardless of its previous condition of magnetization, the impedance of said one of said windings being so selected that when the core is saturated in said one sense a relatively large current is permitted to flow in said load, and when the core is saturated in said opposite sense a relatively small current is permitted to flow in said load.

18. A logical element comprising a saturable magnetic core, two windings linking the core, three multielectrode